(12) United States Patent
Chiaburu et al.

(10) Patent No.: US 8,610,456 B2
(45) Date of Patent: Dec. 17, 2013

(54) LOAD DETECTING IMPEDANCE MATCHING BUFFER

(75) Inventors: Liviu Chiaburu, Chandler, AZ (US); Shahin Mehdizad Taleie, San Diego, CA (US); Dongwon Seo, San Diego, CA (US); Roy B. Silverstein, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 131 days.

(21) Appl. No.: 13/241,516

(22) Filed: Sep. 23, 2011

(65) Prior Publication Data

US 2013/0076436 A1 Mar. 28, 2013

(51) Int. Cl.
*H03K 17/16* (2006.01)

(52) U.S. Cl.
USPC .................. 326/30; 326/82; 326/21; 327/108

(58) Field of Classification Search
USPC ............. 326/56–58, 82–83, 86; 327/108–109
See application file for complete search history.

(56) References Cited

U.S. PATENT DOCUMENTS

| | | | |
|---|---|---|---|
| 5,936,393 A | 8/1999 | Nauta | |
| 5,959,475 A | 9/1999 | Zomorrodi | |
| 6,201,405 B1 | 3/2001 | Hedberg | |
| 7,532,043 B1 | 5/2009 | Butler | |
| 7,579,894 B2* | 8/2009 | Kejriwal | 327/386 |
| 8,410,824 B2* | 4/2013 | Mehdizad Taleie et al. | 327/108 |
| 2006/0220632 A1* | 10/2006 | Koo | 323/299 |
| 2008/0180177 A1* | 7/2008 | Baldwin et al. | 330/298 |
| 2009/0153251 A1* | 6/2009 | Cheng et al. | 330/298 |
| 2010/0019781 A1* | 1/2010 | Woelfl et al. | 324/691 |
| 2010/0123485 A1* | 5/2010 | Lee | 327/109 |
| 2010/0295581 A1* | 11/2010 | Mehdizad Taleie et al. | 327/108 |

OTHER PUBLICATIONS

Ramachandran et al., "A 3.3-V CMOS Adaptive Analog Video Line Driver With Low Distortion Performance", IEEE Journal of Solid-State Circuits, vol. 38, No. 6, Jun. 2003.

* cited by examiner

*Primary Examiner* — Vibol Tan
(74) *Attorney, Agent, or Firm* — Sam Talpalatsky; Nicholas J. Pauley; Joseph Augusta

(57) ABSTRACT

A buffer amplifier has a power on state and a sleep state. During regular operation a coupling state of a load to an output node is detected using feedback voltage. In a sleep mode and in a power collapse mode a detection current is injected into the output node, to produce a voltage, and the coupling state of the load is detected from the voltage. Optionally, the detection current and detecting of the voltage on the output node is enables by a low duty cycle clock. Optionally, signals generated in detecting the coupling state are qualified through a debounce circuit.

37 Claims, 7 Drawing Sheets

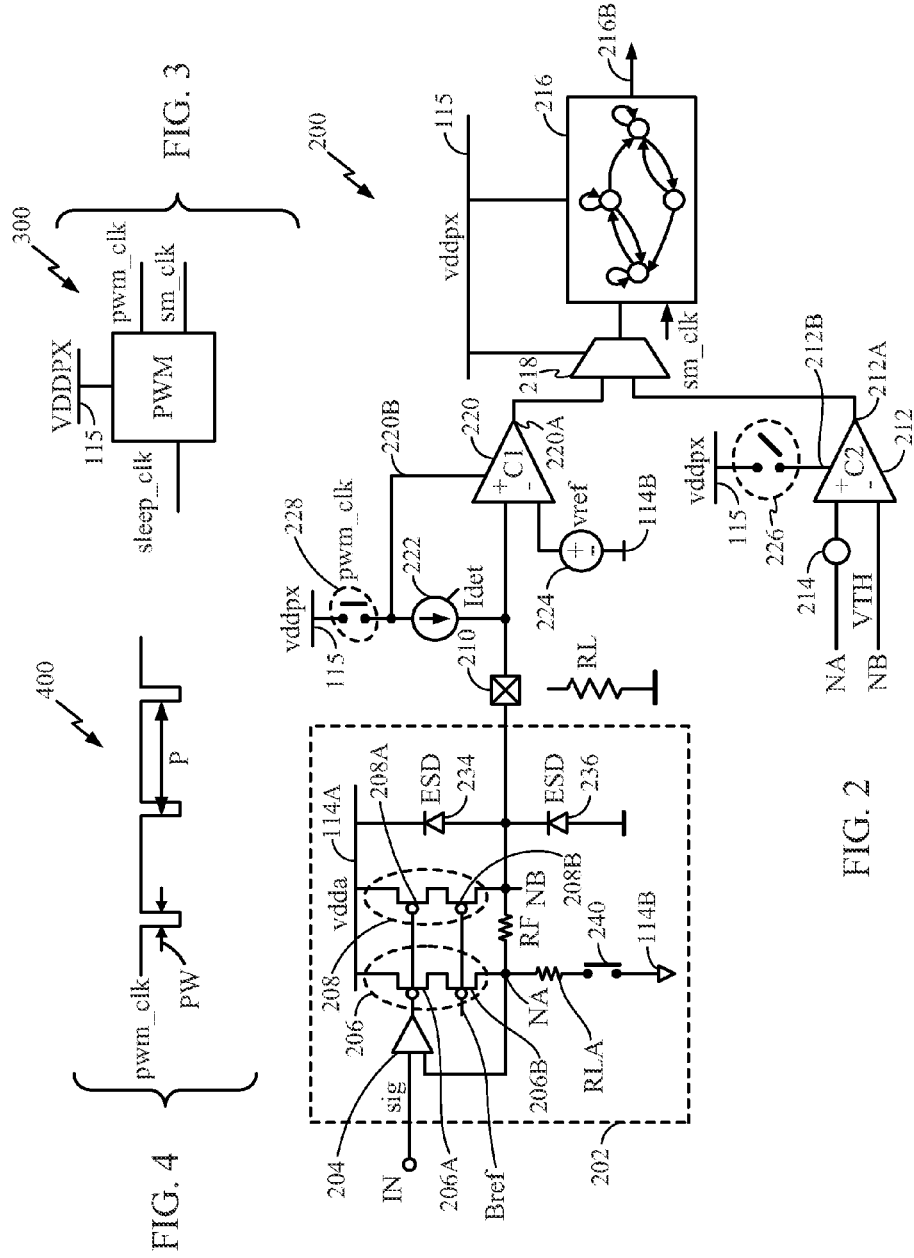

LOAD DETECTING IMPEDANCE MATCHING BUFFER

BACKGROUND

1. Field

The present Application for Patent relates to line drivers, more particularly, to active impedance matched transmission cable drivers.

2. Background

Although the range of communication applications using wireless continues to increase, there are instances and applications for which hard wire transmission lines or cables remain in use. Example reasons include certain there being applications in which means for wireless communication may not be available, or may be impractical or not cost efficient.

There are quality metrics for communication by transmission cables, one being the efficiency in transferring energy from a communication signal source at one end of a cable to a destination, typically a communication signal receiver, at the other end of the cable. There are various known means for improving such efficiency. These include, for example, high conductivity transmission cable, with good quality dielectric, to minimize resistive power loss, power being lost in heating instead of being delivered to the load. Another known means is to maintain a match between the output impedance of the output amplifier (also called, for example, a "buffer," "line driver" or "drive buffer") driving the transmission cable and the characteristic impedance of the transmission cable, and with the impedance of the load at the terminating end of the cable, typically termed a "load impedance." Such matching obtains maximum efficiency in the ratio of the power dissipated at the load, to the power dissipated in the source, and minimizes power loss from reflection of signal energy back from the load toward the source, and/or from positions along the length of the cable back toward the source. The principles of electromagnetic wave propagation by which impedance matching reduces such power loss are well known and, therefore, except where pertinent to understanding an aspect of a present embodiment, further detailed description is omitted.

Conventional line drivers are therefore typically designed and constructed with an output impedance matched, at least within an acceptable range, to the intended load impedance. To provide adaptability and to better maintain power transfer efficiency in actually installed transmission line systems, conventional line drivers may include means for automatic adjustment of their output impedance. However, typically this automatic impedance adjustment requires additional circuitry, and this has cost, in terms of chip real estate and power consumption.

Potentially amplifying the cost of the circuitry for automatically adjustable output impedance are other objectives and goals pertaining to the driving of signals into transmission cables, each having a separate cost in chip real estate and, and in chip power consumption.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any aspect. Its sole purpose is to present some concepts of one or more aspects in a simplified form as a prelude to the more detailed description that is presented later.

Various exemplary embodiments include, among other features and benefits, a combination line driver/cable detector apparatus having automatic impedance matching and having load detecting, in a circuit arrangement employing significant component sharing for reduced overhead.

Various exemplary embodiments further include, among other features and benefits, a combination line driver/cable detector apparatus having automatic impedance matching and load detecting and, further, being capable of operating and, in one aspect, detecting a connecting or disconnecting of load terminated, transmission cable, regardless of which power supply mode in which the apparatus is operating, from among various power-up and power supply modes including, without limitation, a power on mode, one or more sleep modes, or one or more power collapse modes.

Further, various exemplary embodiments include, among other features, a combination line driver/cable detector apparatus having automatic impedance matching and load detecting, capable of detecting a connecting or disconnecting of a load terminated transmission cable and, further, the apparatus including a debounce feature to reduce erroneous detection of transmission cable connecting or disconnecting.

According to one example embodiment, an impedance matched load detecting line driver may include a buffer amplifier switchable between a power-up state coupled to a power voltage on a main power rail and a sleep state in response to a given sleep state signal, having a signal input, a feedback input, a signal output coupled to an output node for coupling to a given load, a feedback resistor coupled between the output node and the feedback input. One example embodiment may also include a first comparator to generate, while the buffer amplifier is in the power-up state, a first load detection signal based on the voltage at the feedback resistor corresponding to whether a given load is coupled to the output node. One example embodiment may also include a detection current source to inject a detection current into the output node while the buffer amplifier is in the sleep state, and to inject a detection current into the output node during a collapse of the main power rail, to produce a voltage on the output node corresponding to whether the load is coupled to the output node. One example embodiment may further include a second comparator to generate, while the detection current is injected into the output node, a second load detection signal based on a resulting voltage at the output node, indicating whether the load is coupled to the output node while the buffer amplifier is in the sleep state and whether the load is coupled to the output node during a collapse of the main power rail.

In one aspect, a load detection signal generating circuit according to one example embodiment may include a debounce circuit having an input coupled to an output of the comparator, to generate the load detection signal based on a combination of a change in a state of the output of the comparator and the changes state having a given continuous duration meeting a given duration criterion.

In one aspect, a load detection signal generating circuit according to one example embodiment may include a control clock generator to generate a low duty cycle control clock having a period of P, an ON state duration of PW, and an OFF state duration of P−PW, and a comparator may be selectively coupled to a secondary power rail through a first power saving switch controlled by at least one of the low duty cycle control clocks.

One example embodiment provides a method for impedance matched load detecting for a buffer amplifier selectively coupled to a main power rail and capable of switching between a power on state comprising: switching the buffer amplifier to the power-on state, and coupling a feedback input of the buffer amplifier to ground, to generate an output signal and a feedback voltage corresponding to whether a given load is coupled to the output node; generating a first load detection signal, based on the feedback voltage, indicating whether a given load is coupled to the output node; switching the buffer amplifier to the sleep state and uncoupling the feedback input from ground; injecting a detection current into the output node, and detecting a corresponding resulting voltage on the output node; generating a second load detection signal, based on said corresponding resulting voltage, indicating whether the load is coupled to the output node while the buffer amplifier is in the sleep state; in response to removal of a main power voltage from a main power rail, uncoupling the feedback input from ground, injecting a detection current into the output node and detecting a corresponding test voltage on the output node; and generating another second load detection signal, based on said power collapse load test voltage, indicating whether the load is coupled to the output node while the main power is removed from the main power rail.

One example embodiment provides a load detecting impedance matched load buffer apparatus having an amplifier means for receiving an input signal and a feedback signal and, in response to receiving a main power and a sleep state signal indicating a power-on state, outputting an output signal to an output mode; and may further include means for generating a first load detection signal indicating whether a given load is coupled to the output node, based on the feedback voltage; means for injecting a detection current into the output node. In one aspect, the injection may be concurrent with the sleep state signal indicating a sleep state, to produce a sleep mode voltage on the output mode corresponding to whether the load is coupled to the output node and, in one aspect, may be concurrent with a collapse of a voltage on the main power rail, to flow from the output node through the load when coupled to the output node, and from the output node and to the main power rail when the load, is not coupled, to produce a power collapse mode voltage on the output node corresponding to whether the load is coupled. In one aspect of one example embodiment, a load detecting impedance matched load buffer apparatus may include means for generating a second load detection signal corresponding to the sleep mode voltage on the output node, and in response to the power collapse mode voltage.

BRIEF DESCRIPTION OF THE DRAWINGS

FIG. 2 shows one schematic of one example load detecting multimode line driver according to one aspect of one or more various exemplary embodiments.

FIG. 3 shows one illustrative duty cycle of one example enabling clock associated with to one aspect of one example load detecting multimode line driver according to one or more various exemplary embodiments.

FIG. 4 shows a high level block diagram of one illustrative clock generator.

DETAILED DESCRIPTION

Figure 1:
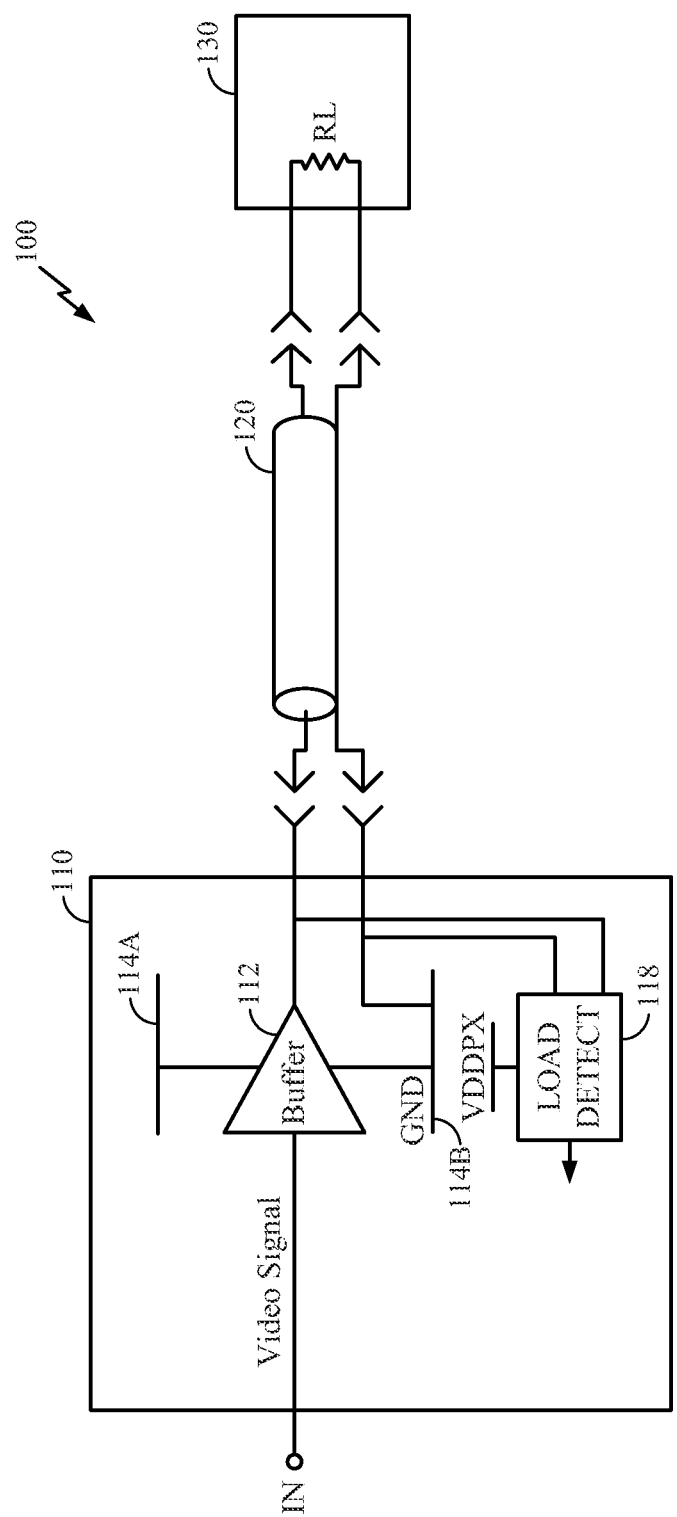
FIG. 1 shows a system schematic of one example load detecting line driver feeding a load through a transmission cable.

The detailed description set forth below in connection with the appended drawings is intended as a description of exemplary embodiments and is not intended to represent the only embodiments in which the present invention can be practiced. The word "exemplary" (and variants thereof) as used herein means serving as an example, instance, or illustration. Any aspect or design described herein as "exemplary" is not necessarily to be construed as preferred or advantageous over other aspects or designs. Rather, use of the word "exemplary" is only intended to illustrate example applications of concepts using simplified concrete examples.

Various specific details are also described, to facilitate a person of ordinary skill in the art in readily obtaining, through this disclosure in its entirety, a sufficient understanding of relevant concepts to practice according to one or more of the various exemplary embodiments. Such persons, though, upon reading this entire disclosure may see that various embodiments and aspects of one or more embodiments may be practiced without, or with alternatives to one or more of these specific details. In other instances, certain well-known structures and devices are shown in block diagram form to avoid obscuring the various novelties of the exemplary embodiments.

Various aspects or features will be presented in terms of systems that may include a number of devices, components, modules, and the like. It is to be understood and appreciated that various systems may include additional devices, components, modules, and so forth, and/or may not include all devices, components, modules, and so on, discussed in connection with the figures. A combination of these approaches may also be used.

The terms "component", "module", "system" and the like, as used herein, are intended to refer to a functional entity, which may be embodied in hardware, firmware, a combination of hardware and software, software, or software in execution. A "component" may be, but is not limited to being, a process running on a processor, a processor, an object, an executable, a thread of execution, a program, and/or a computer. By way of illustration, both an application running on a computing device and the computing device can be a component.

The term "includes," as used in either the detailed description or the claims, is intended to be inclusive in a manner similar to the term "comprising" as "comprising" is interpreted when employed as a transitional word in a claim. The term "or" as used in either the detailed description or the claims, is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

FIG. 1 shows a simplified block diagram of one example transmission cable drive system 100 having a line buffer/cable detection driver 110 that includes a buffer amplifier 112, receiving a Vdda main power voltage from a main power rail 114A and coupled to a main ground (GND) rail 114B, shown driving a transmission cable 120 terminated by an apparatus 130 (e.g., a television set) having a terminating load RL. The buffer amplifier 112 may connect to the transmission cable 120 through, for example, any of the various cable connectors (not separately depicted in FIG. 1) known in the art. As will be understood by persons of ordinary skill in the art, the characteristic impedance of the transmission cable 120 may be approximated as being a purely reactive impedance. Further, at typical signal frequencies transmitted from the buffer amplifier 112 to the load RL that are pertinent to understanding this description, discussion of this reactive impedance and the reactive component of RL may be omitted. The transmission cable 120 and load RL may therefore be assumed to be an ideal conductor cable connecting to a real resistance of RL ohms.

Referring to FIG. 1, a load detector 118 powered by a secondary voltage Vddpx on a secondary power rail 115 couples to the output of the buffer amplifier 112 and to the GND rail 114B. The impedance seen by the load detector 118 when RL is connected through the transmission cable 120 to the output of the buffer amplifier 112 will be the effective output impedance of the buffer amplifier 112 (as that impedance exists when the load RL is connected) in parallel with the load RL. In contrast, the impedance seen by the load detector 118 when the cable 120 is not connected to the buffer amplifier 112 may be detected as the effective output impedance of that buffer amplifier 112 alone, as that output impedance exists at that time. The load detector 118 may therefore be constructed as a circuit separate from the buffer amplifier 112, configured to detect whether the cable 120 and load RL are connected to the buffer amplifier 112 simply based on this difference in effective impedance. However, various costs attributable to such separate circuitry would likely be incurred.

Further, the FIG. 1 example transmission cable drive 100 depicts RL as a fixed value within the destination apparatus 130. However, the RL value may not be known in actual installations due, for example, to differences in RL from among the different devices represented as item 130. To compensate, a buffer amplifier having an automatic impedance matching feature, and its required impedance matching circuitry, may be substituted for the buffer amplifier 112. However, a conventional load detector means 118 for detecting whether or not the transmission cable 120 is connected may, in combination with such a buffer amplifier, present additional costs.

In addition, it has been long known in the art that line buffer amplifiers, because of their high current capability, and typically low output impedance, may consume substantial power even when not connected to load. Therefore, to ameliorate such power consumption, a conventional buffer amplifier in the position of amplifier 112 of FIG. 1 may have a sleep mode, permitting the amplifier to be switched to a "sleep" state when not being used. This sleep state may present still further difficulties, and costs, in constructing a conventional amplifier and a conventional load detecting circuit arranged according to the FIG. 1 example 112 and 118.

Various embodiments of the present invention overcome these and other shortcomings, and provide further advantages including, but not limited to, reduced overhead, obtained from component sharing, multiple power mode operation, enabling detection of cable and other loads being coupled, or not coupled, during any of a plurality of power-up modes. Other example benefits will be understood from the detailed, descriptions that follow.

One exemplary embodiment a multimode load detecting line driver system having a driver amplifier with automatic impedance matching, and includes various load detector (i.e., transmission cable connect/disconnect detector) aspects, embodying and exploiting cooperative circuit architectures, combinations and arrangements, which are described in greater detail at later sections. As also described in greater detail, in various aspects of the exemplary embodiments, various circuitry components function both as a portion of an automatic impedance matching and as a portion of one or more load detectors.

As will be understood and appreciated by persons of ordinary skill in the art, among the benefits and advantages of line driver systems according to these embodiments, in addition to a reduced overhead, is a capability of performing detection of a transmission cable being connected or disconnected, regardless of which from a plurality of power supply or power-up modes in which such a line driver system is operating.

One example multimode load detecting line driver system according to one embodiment includes a buffer amplifier configured as a transconductance amplifier having an automatic impedance matching circuitry. In one aspect the automatic impedance matching circuitry may include a feedback circuitry having, in combination with other circuit elements, an internal load resistor and a feedback resistor coupling the output node to the feedback input. In one aspect, the feedback circuitry drives the gain of the transconductance amplifier until a voltage on the internal load is substantially equal to a voltage at the output node. According to one aspect, a voltage on the feedback resistor indicates the voltage difference between the internal load resistor and the output node. Further to this aspect, if the transmission cable is disconnected the transconductance amplifier gain cannot reduce the voltage difference on the feedback resistor less than a given first threshold. In one aspect, a first comparator therefore compares this voltage difference on the feedback resistor to the first threshold and, based on the comparison, generates power-up mode load detection signal.

As will be appreciated, the above-described detection feature for generating a power-up mode load detection signal, since it exploits the relationship of the voltage at the feedback resistor to the load being coupled or not coupled, while the transconductance amplifier is operating, may not be able to detect the transmission cable being reconnected after the transconductance amplifier is switched to a sleep state, or if the transconductance amplifier is in a power collapse mode in which a main power voltage is removed from the main power rail.

Continuing in overview, in another aspect a detection current source to inject a detection current into the output node, and a second comparator to compare the voltage at the output node while the detection current is being injected to a second threshold, may be provided. Further to this one aspect, the detection current and the second threshold may be set such that the voltage at the output node resulting from the detection current being injected into that node has a value above the second threshold if the given load is not coupled to the output node, and a value less than the second threshold if the given load is coupled to the output node, regardless of whether the transconductance amplifier is in a sleep mode or a power collapse mode.

In another aspect, the detection current and the second threshold may be set to form and exploit, while the transconductance amplifier is in the power collapse state, different current paths from the output node to a ground, with the difference depending on whether or not a given load is coupled to the output node. Further to this one aspect, in one example a first power collapse mode current path from the output node to a ground is formed when the given load is coupled to the output node, and a second power collapse current path is formed when the given load is not coupled to the output node. The second power collapse mode current path may have a higher resistance than the first power collapse mode current path, such that the detection current establishes a different voltage on the output node depending on the coupling state of the given load to the output node. In one aspect, a second comparator compares this voltage on the output node, while the amplifier is in the power collapse mode, to a given second threshold.

In other exemplary embodiments, various aspects provide power savings using a low duty cycle enablement of various components of the load detecting circuitry. In one aspect, one more comparators that detect voltages indicative of the load being coupled or not coupled may connect to a power supply through ON-OFF switches controlled by a low duty cycle clock pulse. This may obtain power savings over a continuous enablement of the comparators. In another aspect, detection current sources to inject detection load detection currents may be controlled by a similar low duty cycle clock pulse, to only inject detection currents intermittently, and therefore obtain further power savings.

In further exemplary embodiments, various aspects provide filtering of the load detect signals according to a given duration criterion, i.e., debounce features to reduce or substantially prevent erroneous detection of a load being connected or disconnected. Such embodiments provide compensation for manual connecting or disconnecting a transmission cable causing intermittent electrical contacts and disconnects between the one connector end attached to the transmission cable and the mating connector end coupled to the buffer amplifier output. Such embodiments may further provide resistance to false detection of a load change due to intermittent contact arising from, for example, flexing and vibration from environmental events.

In one aspect, a debounce circuit may implement a state machine having states representing a coupling status of a given load, and various transition for changing states. One example state may be a resting state representing a load having been detected as coupled, or as not coupled, for a continuous duration meeting a given criteria. Another example state may be an interim state representing a first detection of a change, such as a first detection of a load coupling encountered while in a present resting state representing a load being not coupled. One example transition may be a transition for one of the resting states to one of the interim states as a result of such a first detection. Another example transition may be a return to a resting state preceding an interim state in response to a detecting of the change in coupling state by which the machine entered the interim state as terminating prior to a duration criteria being met.

FIG. 2 shows one illustrative example of one multimode, impedance matched/load detecting line driver system 200 (hereinafter "multimode driver/detecting system") according to one or more exemplary embodiments. The example multimode driver/detecting system 200 has a transconductance automatic impedance matching amplifier (hereinafter referenced as "TCM" for brevity) 202 formed of a differential amplifier 204 having two inputs (not separately numbered), one receiving a voltage signal IN from an external signal source, the other connected by a feedback line 205 to a node NA within a feedback network described later in greater detail. In one aspect, the TCM 202 receives power from, for example, the Vdda main power rail 114A, through a sleep switch (not shown in the figures), for switching the TCM 202 between an operating state and a sleep state. Circuit designs providing for switching powered components between an operating state and a sleep state, typically in response to a received sleep state signal, are known to persons of ordinary skill in the relevant art and, therefore, further detailed description of such circuits is omitted.

With continuing reference to FIG. 2, in the multimode driver/detecting system 200 the differential amplifier output 204A feeds the gate of the upper, active P-channel field effect transistor (PFET) 206A in a first voltage-to-current stage 206, and the gate of the upper, active PFET 208A in a second voltage-to-current stage 208. As will be described in greater detail, and as will be understood by persons of ordinary skill in the art from viewing FIG. 2, the two stage arrangement of 206, 208 in combination with other depicted elements of the feedback network, provides feedback for the TCM 202 to operate as a transconductance amplifier, and provides the associated automatic impedance adjustment to accommodate variations in the value of RL.

As shown in the example multimode driver/detecting system 200, the gates of the bottom, cascode PFETs 206B and 208B of the first stage 206 and second stage 208, respectively, may connect to a bias reference BRef, for further adjustment of the output impedance of the TCM 202. A node NA connects to one of the two differential inputs of the TCM 202 and is switchably coupled to a local ground reference, such the GND rail 114B, through an internal load resister RLA and mode-enabled power switch 240, described later in greater detail. A feedback resister RF connects from node NA to node NB, which may be considered as the output node of the TCM 202.

With continuing reference to FIG. 2, the mode-enabled power switch 240 is an ON-OFF switch, meaning closed when it is ON and open when it is OFF. The mode-enabled power switch 240 is configured to be ON as long the following conditions exist: the TCM 202 is in an operational state, where "operational state" means Vdda power is on the main power rail 114A and the TCM 202 is not in a sleep state. The mode-enabled power switch 240 is configured to switch OFF and thereby disconnect node NA from the GND rail, upon anyone of the following two conditions occurring: (i) receipt of an externally generated sleep state signal (not shown) that switches the TCM 202 is switched to a sleep state, or (ii) the Vdda voltage on the main power rail 114A collapses. The mode-enabled power switch 240 may have an ideal ON resistance of zero, where "ON resistance" means resistance additional to the RLA resistance. Persons of ordinary skill in the art can readily design and construct, and/or select from various vendors, switch circuitry to implement the mode-enabled power switch 240, Therefore further detailed description of the structure of the mode-enabled power switch 240 is omitted. Further, it will be understood that the RLA resistance and the mode enabled power switch 240 may be implemented as a single device, or with two or more devices. For this reason, the term "switchable feedback resistor" refers to the collection of the mode-enabled power switch 240 and the RLA.

Referring still to FIG. 2, in the example multimode driver/detecting system 200 the top, active PFET 206A and the bottom, cascade PFET 206B may, or may not be identically structured and, likewise, the top, active PFET 208A and bottom, cascade PFET 208B of the second stage 208 may, or may not be identically structured. However, with respect to the PFETs 208A, 208B of the second stage 208 as compared to the PFETs 206A, 206B of the first stage 206 there is preferably, according to one aspect, a proportional relation. Further to this one aspect, the proportional relation may be such that, in certain ranges of operation that will be understood from this disclosure, at a given voltage at the output 204A of the differential amplifier 204 feeding the gates of 206A and 208A, a current through the second stage PFETs 208A, 208B may be a multiple of a current through the first stage PFETs 206A, 206B. Still further to one aspect, for related reasons the resistance of the internal load resistor RLA may be selected to be the same multiple larger than the intended load resistance RL.

With continuing reference to FIG. 2, to illustrate concepts as to the proportionality of the second stage PFETs 208A, 208B to the first stage PFETs 206A, 206B, and the related proportionality of RLA and RF to RL, it will be assumed that the load RL is coupled to the connector node, i.e., output node 210. It will also be assumed that RL is within the drive capability of the TCM 202. The output node 210 may represent, for example, a cable connector or equivalent type of mechanical structure that may be coupled by an internal conducting path to the output node NB. For purposes of this description, the output node NB and the output node 210 may be considered identical. To still further assist in illustrating concepts as to the proportionality of 208A, 208B to 206A, 206B, and of RLA and RF to RL, it will also be assumed that the differential amplifier 204 is in a power-up state. An example power-up state is a main power voltage being on the main power rail 114A, and any switchable connections (not shown in FIG. 2) to selectively connect the differential amplifier 204 to the main power rail 114A, or to the local ground GND rail 114B, being closed.

Referring to FIG. 2, it will be understood that in a steady state operation with RL coupled to the output node 210 that the voltage at NA will be approximately equal to the voltage at NB. Ideally the voltage at NA is equal to the voltage at NB. However, there may be a small steady state voltage difference between NA and NB, in an actual physical circuit according to FIG. 2, due to factors such as component non-linearity, ground loops and coupling from other components. As one illustrative example, a steady state voltage difference between NA and NB in a circuit according to FIG. 2 may range from approximately zero, to approximately 20 mV and above. The value of approximately 20 mV is only for illustration; values lower or higher may be observed, depending on factors such examples identified above, as will be understood by persons of ordinary skill viewing this disclosure.

With continuing reference to FIG. 2, it will be understood that if RLA were set equal to RL then, since the voltages at NA and NB are approximately the same, the power dissipated by RLA would equal the power dissipated by RL. This would typically be not desirable. Further, the current through 206A, 206B, as well as through 208A, 208B, might be unacceptably high. For these and other reasons, RLA is preferably set as a multiple N of RL. In one aspect, to obtain a good feedback operation, RF may be set at (N+1) times RL. As to the section of N, one factor is that the steady state voltage across RLA is equal to that across RL. Since power dissipated by a resistor is inversely proportional to its resistance R, to minimize the power dissipated by RLA N would be set at a very high number. However, as will be understood, if N is too high an acceptable feedback operation may not be obtained. For purposes of illustration, one example value of N may be ten. Based on this description, persons of ordinary skill in the art will understand relevant concepts to identify a value of N meeting specific requirements, e.g., a current capacity of the amplifier implementing the differential amplifier 204, and the anticipated range of the load resistance RL.

Continuing with an assumed example N of ten, it will be assumed that the structure of PFETs 208A, 208A relative to PFETs 206A, 206B is such that, in a steady state, the current through the second stage current path (from the main power rail 114A through 208A and 208B to node NB) is ten times the current through the first stage current path (from the GND rail 114B, through 206A, 206B, to the node NA).

Still referring to FIG. 2, in the example multimode driver/detecting system 200, a first comparator 212 is coupled to the nodes NA and NB, and this first comparator comparing this voltage difference, i.e., the voltage drop across RF, to a first threshold voltage VTH1 received from, for example, a first voltage reference 214. The value of VTH1 may be readily determined from the calculated steady state voltage drop across RF when the TCM 202 is powered up and RL is coupled to the output node 210. As one illustrative example, using an assumed main power voltage Vdda of 1.5 volts on 114A, one RL value may be 75 Ohms then, continuing with the above example N of ten. RLA would be preferably set at 750 Ohms, and RF, being (N+1) times RLA, would be preferably set at 825 Ohms. As previously stated, and as will be understood, these are only example values. Persons of ordinary skill in the art, based on this disclosure, may readily identify and select other values for particular applications. Similarly, persons of ordinary skill in the art may readily determine acceptable tolerances for the resistance values to meet specific given performance requirements.

Continuing with the above-describe example of RL being 75 Ohms, N being ten and, therefore RLA and RF being 750 Ohms and 825 Ohms, respectively, one example of a voltage drop across RF that may be exhibited is approximately 20 mV. Using this example, the first reference voltage source 214 may therefore be implemented to deliver a VTH of, for example 90 mV to the first comparator 212. As will be understood, the VTH value of 90 mV may be sufficiently distant from 20 mV to provide an acceptably low level of false detections. As will be described in greater detail in reference to the FIG. 5 example 500, if the example 75 Ohm RL is uncoupled from the output node 210, the voltage drop across RF will necessarily go substantially above this VTH of 90 mV. The first comparator 212 will then output a logical "1" signal. It will be understood that the labels of logical "1" and logical "0" for the output of the first comparator 212, and for all other signals representing physical state, as well as the voltages that represent such logical "1 and "0," are arbitrary.

As shown in the FIG. 2 example multimode driver/detecting system 200, the output 212A of the first comparator 212 may be coupled to a debounce circuit 216, which is described in greater detail at later sections. In addition, as also shown in the FIG. 2 example 200, a multiplexer such as 218 may be interposed between the first comparator 212 and the debounce circuit 216. In the example 200, the multiplexer 218 is provided so that the output 220A from a second comparator 220 may also be connected to the debounce circuit 216.

Referring still to FIG. 2, in one aspect a second comparator 220 in a particular combination and arrangement with a detection current source 222 provides detection, when the TCM 202 is in a sleep state (not shown in FIG. 2), of whether a load, such as RL (e.g., a cable connecting to a device such as a display) is or is not coupled to the output node 210. In a further aspect, the second comparator 220 in a combination and arrangement with the detection current source 222 provides detection, when the TCM 202 is in a power collapse state (also not shown in FIG. 2), of whether a load such as RL is or is not coupled to the output node 210 An example power collapse state is where the main power voltage Vdda is removed from the main power rail 114A. Further to these aspects, and as will be described in greater detail at later sections, the level of the voltage produced at the output node 210 by the detection current Idet injected into that output node 210 by the detection current source 222 corresponds to, and therefore indicates whether the load RL is coupled to the output node 210. The level of the corresponding voltages, and hence the level of Vref the second reference voltage source 224 must feed the second comparator 220 to detect the difference, may be readily determined. For a given Idet the level of Vref may, for example, be determined by straightforward calculation of the two different resistances between the output node 210 and ground that correspond, respectively, to the load resistor RL being coupled or not coupled to the output node 210. The two resistances are described in greater detail at later sections.

In one aspect, detection of the load RL being coupled or not coupled to the output node 210 may be provided during a sleep state, in which Vdda is provided on the main power rail 114A, but one or more switches (not shown in FIG. 2) connecting the TCM 202 to the main power rail 114A, or to the local ground GND rail 114B, are open. Further to this one aspect, determination of the current Idet, and determination of a second reference voltage Vref generated by, for example, the second reference voltage source 224 to detect these different resistances and, therefore, detect whether the load RL is coupled, to the output node 210, may be made. For example, referring to FIG. 2, it is seen that when the RL load is coupled to the output node, RL is the predominant path from the node 210 to ground. Other parallel paths may exist, but typically these have resistance sufficiently greater than RL that consideration may be omitted. When the load RL is disconnected from the output node 210, though, the only paths to ground from the output node 210 may, for example, be the input resistance of the "+" input of the second comparator 220. These resistances, although parallel, are typically very high and therefore form a total resistance, which may be called Ropen, from the output node 210 to ground that is typically much higher than RL. Based on the resistance RL and the determined Ropen, a level for Idet and a level for Vref may be easily selected such that the injection of Idet into the output node 210 when the RL is coupled produces a voltage consistently below Vref, while such injection of the current Idet when the RL is not coupled to the output node 210 produces a voltage consistently above Vref. The selection of Idet may take into consideration an overhead cost in generating an unnecessarily large Idet, and a potential for error by the second comparator if Idet were set too low.

With continuing reference to FIG. 2, in another aspect, a current injection similar to the above-described injection by the detection current source 222 of Idet into the output node 210 and comparison, by the second comparator 220 of the resulting voltage against Vref may be performed while the TCM 202 is in a power collapse state, e.g., the main power voltage Vdda is removed from the main power rail 114A. In this aspect it will be assumed that the secondary voltage Vddpx remains on the secondary power rail 115 during the power collapse. Further to one aspect, it may be assumed that the main power rail 114A while in a power collapse state may be modeled as a resistance, RPULL, from the main power rail 114A to ground. This resistance RPULL is not shown in FIG. 2, but is shown in the equivalent circuit model 600 depicted at FIG. 6, described later in farther detail, which represents relevant portions of the FIG. 2 example 200 when in the power collapse mode. One example value of RPULL may be 100 Ohms. This RPULL value is merely illustrative, and not a limitation. Persons of ordinary skill in the art may easily determine the equivalent resistance represented by RPULL for particular applications. Further, such persons will be able to quickly modify other example component values relating to RPULL to accommodate values of RPULL that differ from 100 ohms.

With continuing reference to FIG. 2, the example multi-mode driver/detecting system 200 may include an electrostatic discharge diode (ESD) 234 coupling the output node 210 to the main power rail 114A, and an ESD 236 coupling the GND rail 114B to the output node 210. As will be described in greater detail at later sections, according to one embodiment the example multimode driver/detecting system 200 detects whether or not RL is coupled to the output node 211) during a power collapse state, e.g., when the Vdda voltage on the main power rail 114A collapses. According to one aspect, power collapse mode load detection can be provided using, in combination with other structures that are described, a diode element, for example, the upper ESD 234 and/or the body diode effect of PFET 208A.

Continuing to refer to FIG. 2, a multimode driver/detecting system according to one or more embodiments, such as the example 200, performs power mode load detection by selecting Idet such that, when the load RL coupled to the output node 210, the Idet injection current produces a voltage on RL, the predominant path to ground, lower than VREF generated by the second reference voltage source 224. In addition, Idet generated by the detection current source 222 is set so that when the load RL is not coupled to the output node 210, the Idet injection current produces a voltage on the output node 210 that forward biases at a diode element such as at least one of the body diode effect of the PFET 208A and, if present as depicted, the upper ESD 234. This establishes a current path for the Idet injection current from the output node 210, through at least one of a forward biased body diode effect of PFET 208A or upper ESD 234, to the main power rail 114A and then, through a resistance modeling the main power rail 114A in a power collapse state, to ground. The resistance of this path from the output node 210 to ground is higher than the RL resistance. The Idet through this path therefore produces a voltage on the output node 210 higher than the voltage that Idet produced when RL was the path to ground. Therefore, the level of Vref from the second voltage reference source 224 may be selected relative to Idet such that, considering the resistance difference between the above-described two different paths from the node 210 to ground, the second comparator 220 detects whether the load RL is coupled or not coupled.

With continuing reference to FIG. 2, it will be appreciated that the above-described detection by the second comparator 220 is performed even though the TCM 202 is in a power collapse state. Further to this aspect, it will be understood that structures other than the body diode effect of PFET 208A and/or ESD 234 may be used to provide a path for Idet from the output node 210, through the RPULL model of the collapsed main power rail 114A, and to ground when RL is not coupled to the output node 210. It will also be understood that the resistance of such a structure must (when added to RPULL) be sufficiently higher than the load RL to obtain a consistently detectable difference in the voltage at the output node 210 from the injection of a current such as Idet when while the load RL is coupled to the output node 210 as opposed to the voltage obtained from injecting that current while the load RL is not coupled to the output node 210. One illustrative alternative structure may be a silicon controlled rectifier (SCR) or equivalent. Further, as previously described, one or both of the PFETs 206A or 208A may be constructed to exhibit, in the presence of a power collapse on the main power rail 114A, sufficient body diode effects that ESDs 234 may be omitted, or may not be utilized for detecting whether the load RL is connected.

Referring still to FIG. 2, it will be understood that the detection current source for detecting the load RL being coupled to the output node 210 during the power collapse mode may, or may not be the same detection current source 222 described as injecting the detection current Idet for detecting the coupling state of the load RL during the sleep mode. Likewise, it will be understood that the comparator comparing the voltage at the output node 210 to a reference, while injecting the detection current into the output node during the power collapse mode, may or may not be the same second comparator 220 described as performing such comparison for detecting the load RL being coupled or not coupled to the output node 210 during the sleep mode. Still further, it will be understood that the reference value against which the voltage at the output node 210 is compared while injecting the detection current into the output node 210 during the power collapse mode, may or may not be the Vref of the reference 224 used by the second comparator 220 for detecting the load RL being coupled or not coupled to the output node 210 during the sleep mode.

Referring still to FIG. 2, in one aspect an optional first power saving switch 226, configured to switch ON and OFF in response to a preferably low duty cycle pulse-width control clock pwm_clk, may connect a power supply terminal 212B of the first comparator 212 to the secondary power rail 115. It will be understood that the first power saving switch 226 is optional, and that a direct connection may be substituted for the first power saving switch 226 or, equivalently, the first power saving switch 226 may be fixed in an ON state.

FIG. 3 shows an example pulse-width control clock generator 300 to generate pwm_clk. As depicted by FIG. 3, the example pulse-width clock generator 300 may, in one further aspect, generate a second clock such as sm_clk that may, for example, be a delayed replica of pwm_clk. As will be described in greater detail in reference to FIG. 7, a clock such as sm_clk may control a &bounce circuit according to one or more embodiments. As depicted by the FIG. 3 example 300, in one aspect the pulse-width clock generator 300 may be powered by an auxiliary power such as Vddpx on, for example, an auxiliary power rail such as the example rail 115 of FIGS. 1 and 2. Further, as depicted by the FIG. 3 example 300, in one aspect the pulse-width clock generator 300 may generate the pwm_clk based on, for example, a conventional sleep state clock, labeled sleep_clk, which may be externally generated.

FIG. 4 shows one example waveform 400 for a low duty cycle control clock, such as pwm_clk, for controlling a second power saving switch, such as the example second power saving switch 228 shown in the FIG. 2 example 200, connecting a power supply terminal 220B of the second comparator 220, and as connecting the detection current source 222 to the secondary power rail such as the depicted rail 115. Referring to FIG. 4, the example waveform 400 for the low duty cycle control clock pwm_clk generated by the FIG. 3 clock generator 300 has a pulse width PW, and pulse period P. The polarity of the waveform 400 representing ON and OFF, where "ON" means the controlled power saving switch is closed and "OFF" (having a duration of P minus PW) means the controlled power saving switch is open, is arbitrary. In the depicted example 400, though, a low level of the pwm_clk is assumed as causing an "ON" state of the controlled power saving switch and a high level of the pwm_clk is assumed as causing an "OFF" state of such switches.

The period P and the pulse width PW are each a design choice, readily performed by a person of ordinary skill in the art by applying conventional design know-how to the present disclosure. As described in reference to FIG. 3, one example, simply picking an arbitrary value among what a person of ordinary skill in the art will understand to be a much wider range of possibilities, in one aspect the pulse-width clock generator 300 may generate the pwm_clk based on, for example, a conventional sleep state clock, labeled sleep_clk. One frequency for the pwm_clk, i.e., 1/P, may be, but is not necessarily, 32 KHz. For such an example frequency of 32 KHz, the period P is 8 ms. One illustrative PW for the pwm_clk may, further to an example 1/P frequency of 32 KHz may be, but is not necessarily, 31.5 µS. As will be appreciated, using an example P of 8 ms and an example PW of 31.5 µS as an illustration, controlling one or both of the first or second comparators 212 or 220, respectively, and/or the detection current source 222, with the second power savings switch 228, may provide detection of a coupling state of a load such as RL using only PW/P, e.g., approximately 0.4% of the power required for continuous operation of such comparators and/or current injection sources.

Figure 5:
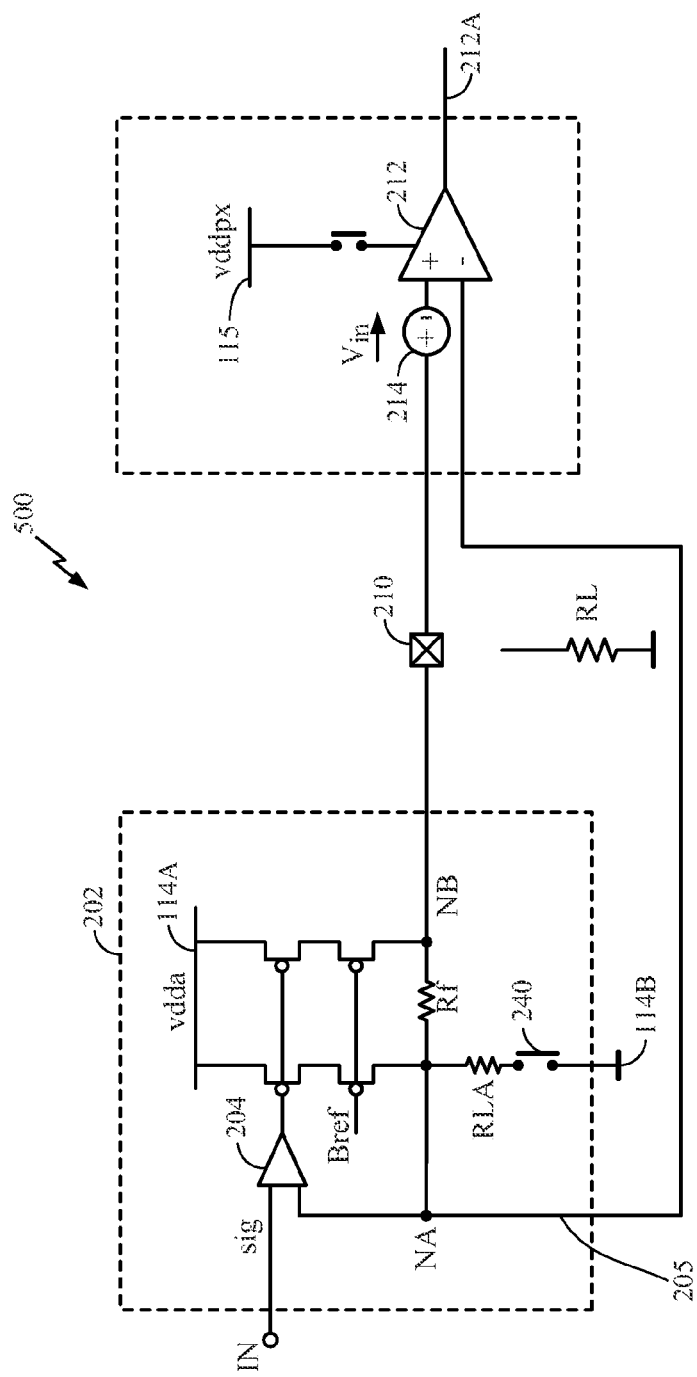
FIG. 5 shows one schematic representation of one mode, according to one aspect, of one example load detecting multimode line driver according to one or more various exemplary embodiments.

FIG. 5 shows the equivalent circuit 500 of the example 200 when the Vdda power on the main power rail 114A is ON and the TCM 202 is powered up. As previously described, in this power-up mode when the RL load is connected the voltages at nodes NA and NB are almost equal, assuming RL is within the load capacity of the TCM 202, and the signal at the IN point is within a given range of acceptability. In other words, when RL is connected to the output node 210 the voltage drop across RF is approximately zero and, in particular, significantly less than the threshold voltage VTH received from the voltage reference 214. The output of the first comparator 212 is therefore driven low, i.e., is logical 0. When Rh is disconnected the voltage at NB becomes higher than the voltage at NA, by more than VTH. The output of the first comparator is therefore driven high, i.e., to a logical "1." In one aspect these outputs from the first comparator 212 are input to a debounce circuit, such as 216 (not shown in FIG. 5), described in greater detail at later sections.

Figure 6:
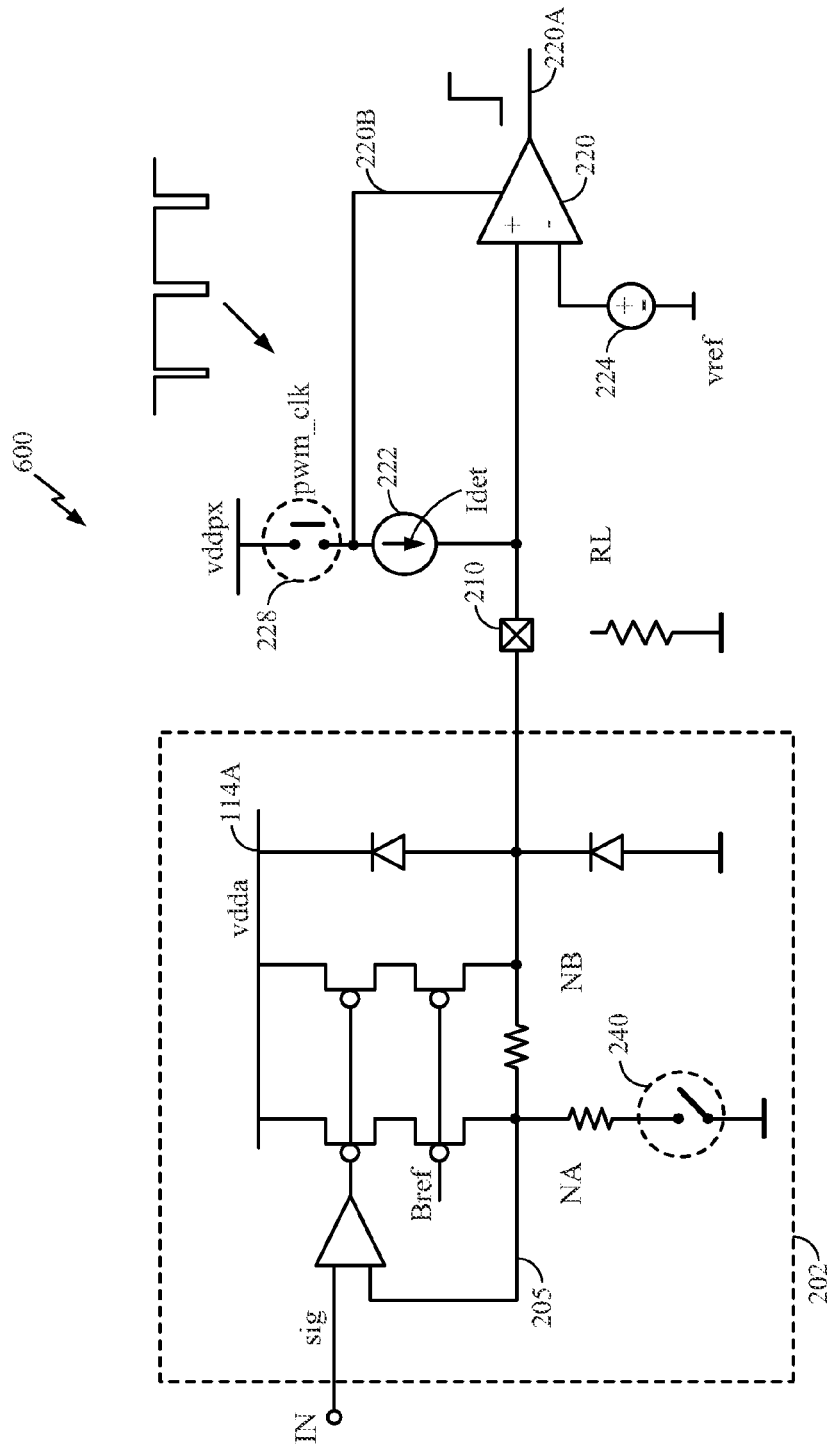
FIG. 6 shows one schematic representation of one mode other than represented at FIG. 4, according to one aspect of one example load detecting multimode line driver according to one or more various exemplary embodiments.

FIG. 6 shows an equivalent circuit 600 formed when the FIG. 2 example system 200 is switched to a sleep power mode, for detecting whether the load RL is coupled to the output mode, while TCM 202 is in a sleep state. This may be performed by, for example, opening a sleep state control switch (not shown) connecting the TCM 202 to the main power rail 114A. Although the TCM 202 is in a sleep state the Vdda on the main power rail 114A is ON. Since the secondary voltage Vddpx on the rail 115 is preferably lower than Vdda on the main power rail 114A, neither the top ESD 234 nor the PFET 208A body is forward biased.

Referring still to FIG. 6, during the sleep power mode as previously described the mode-enabled switch 240 connecting RLA is OFF, i.e., open. RLA is therefore not connected to the GND power rail 114B. Assuming the second comparator 220 and the detection current source 222 are each enabled by the pwm_clk low duty cycle control clock, during the enable time window (PW), Idet is injected into the output node 210.

If the cable, i.e., the load RL is connected to the node 210, the RL resistance provides a path to ground for the Idet current. RL is effectively the only path to ground, because the mode-enabled switch 240 being OFF removes the path through RLA to the GND rail 114B. Assuming, as an illustrative example, Idet=20 μA and Rh=75 Ohms, the voltage at node 210 will be approximately 1.5 mV, which is well below the example Vref of 90 mV. The second comparator 220 therefore, even though enabled, will generate a logical "0." If RL is disconnected from the output node 210, however, the only path for the test current is into the "+" node of the second comparator 220. This will pull the node 210 to a logical "1," this being a voltage only slightly below Vddpx (e.g., 1.8V) which is considerably higher than the example Vref of 90 mV. At the end of the PW pulse, i.e., the enable time window, the output of the second comparator 220 may be latched in the debouncing circuit 216, described later in greater detail.

Figure 7:
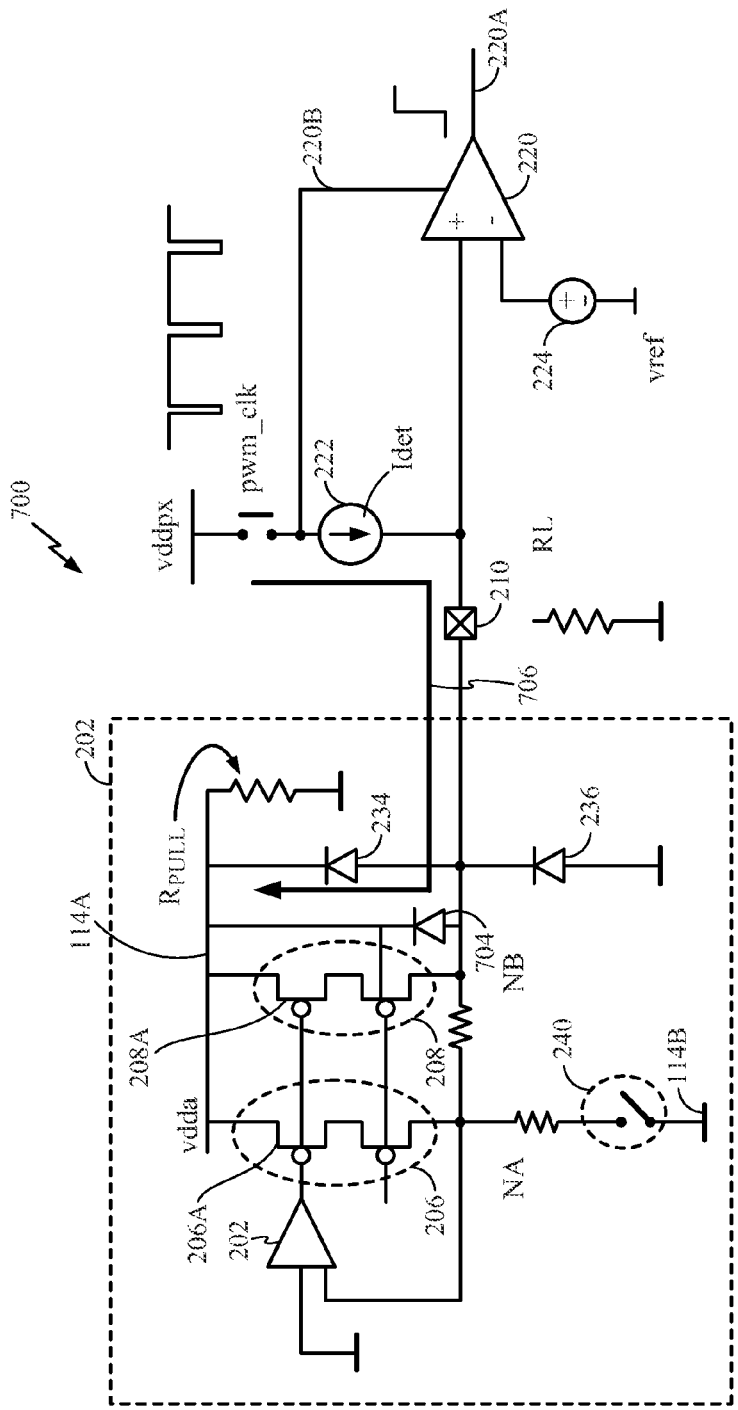
FIG. 7 shows one schematic representation of one mode other than represented at either of FIG. 5 or 6, according to one aspect of one example load detecting multimode line driver according to one or more various exemplary embodiments.

FIG. 7 shows an equivalent circuit 700 formed when the FIG. 2 example system 200 is placed in a power collapse mode, for example by removing the Vdda main power voltage from the main power rail 114A. In this power collapse mode, load detection may be performed by the second comparator 220 and detection current source 222 in substantially the same manner as these performed the load detection during the sleep power mode as described in reference to FIG. 6.

Referring to FIG. 7, as previously described a power collapse mode may be modeled as removing the Vdda main power voltage from the main power rail 114A and, in its place, inserting an equivalent resistance RPULL to ground. One illustrative example value for RPULL is 100 Ohms. When RL is connected to the output node 210, the detection current Idet runs through RL to ground. Using the example Idet of 20 μA, the voltage at the output node 210 will therefore be very small (i.e., <2 mV), as was described above in the power-save mode. When the load RL disconnected from the output node, though, the Idet will have a path 704 through the body diodes of the output PFETs 206A and 208A to the main power rail 114A and, because of this current producing a voltage higher than the forward threshold voltage of the diode body effect of PFET 208A and ESD 234, through the PFET 208A and the ESD diode 234 as well. This path is depicted by the line 706. If Vref is set to be, for example, ½ of the calculated the lowest voltage (which may be referred to as "V/min") at the output node 210 while the detection current Idet is injected, then the second comparator 220 will, with a typically acceptable certainty, generate a logical "0" when the load RL is coupled to the output node 210 and a logical "1" when the load RL is not coupled to the output node 210. In the FIG. 2 example 200, this Vref may be set to 90 mV. Therefore, as can be readily seen by a person of ordinary skill in the art, a system such as 200 may be easily constructed such that this Vref is the same as the Vref for detecting the coupling state of the load RL when the system is in a sleep power state.

Referring again to the FIG. 2 example system 200, illustrative structures and methods for the debounce circuit 216 will now be described. In overview, typically when a load RL is connected or disconnected from an output node such as 210, such by connecting or disconnecting a transmission cable to the load RL, the connection becomes intermittent, going through a series of short connect/disconnect cycles before it settles. The output comparators such as 212 and 220, when active, may therefore go through the same cycles, switching between high and low until the output becomes stable.

In one aspect, the outputs of these comparators 212 or 220 may be is integrated, using an integrate-and-dump mechanism, and this may acceptably eliminate any detection ambiguity that may result from such cycling. Further to this aspect, one example implementation may be particular debouncing state machine. In high level description, one state machine according to this aspect may have effect the following: If the signal is stable until the integrator reaches the threshold then it is passed to the output. If the signal changed before the integrator reached the threshold it is reset and the process starts over again. As will be appreciated from this and the further detailed description that follows, this mechanism operates to render short term fluctuations of the input not visible at the output.

In one example integration according to this aspect, an integration period may be 250 ms. It will be understood that the 250 ms period is only an example for purposes of illustration, and not a limitation on the particular integration periods that may be uses in practicing the embodiment. For the example period of 250 ms, the result of the detection has to be stable for at least 250 ms in order for the state machine to pass that result to the output. In one example, an integrator may be implemented as a counter. According to one aspect, an integrating counter may use a clock such as, for example, the pwm_clk low duty cycle clock previously described. In another aspect, an edge of the pwm_clk may be used to latch outputs from comparators such as 212 and 220. Also, to accommodate delays, an integrating counter may use a delayed version of that pwm_clk control clock. Referring to FIG. 3, one example of such a delayed clock may the sm_clk shown as generated by the example clock generator 300.

The integration period is a design choice, readily made by a person of ordinary skill in the based on this disclosure. One illustrative example may use a five bit counter, clocked by, for example, a sleep_clk as shown in the FIG. 3 example 300. Assuming an example sleep_clk frequency of 32 kHz, a full count of such a five bit counter (for five bits this being from 0 to 31) will take 250 ms. Further to this example, one debounce state machine implementing the debounce 216 of FIG. 2 will pass an output of the comparators 212 or 220 to the debounce output 216B only if that comparator output is stable for 250 ms.

Figure 8:
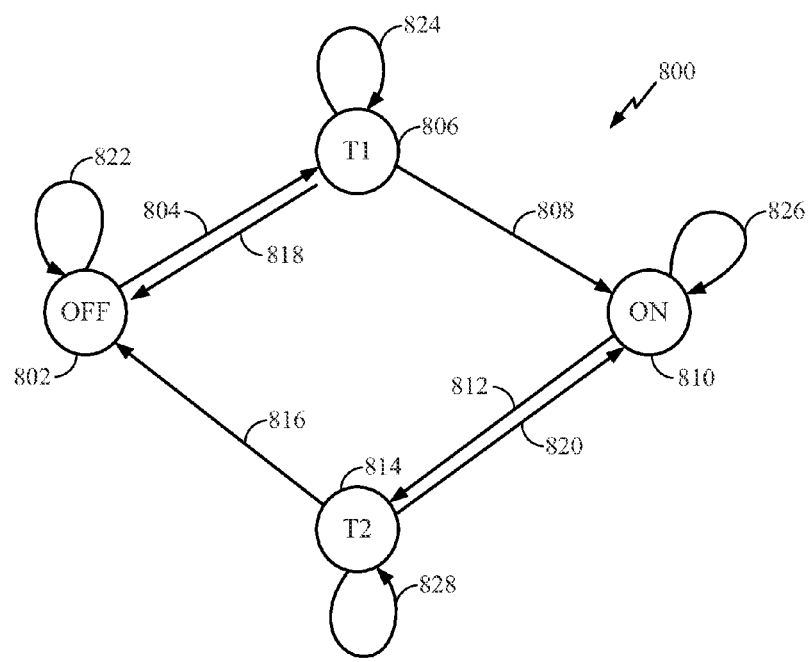
FIG. 8 shows one example of a state machine representation of one illustrative debouncing process according to one aspect of one example load detecting multimode line driver according to one or more various exemplary embodiments.

FIG. 8 shows an example state machine diagram 800 representing one example state machine implementation for the debounce circuit 216. In describing the state machine diagram the term "transition" defines a present state and, upon occurrence of an event, moving or transitioning to a resulting next state. Referring to FIG. 8, the state machine has a load OFF rest state 802, and has a load ON interim state 804 that is a next state from the load OFF rest state 802, reached through a first transition 806. The first transition 806 may occur, for example, upon latching a logical "0" at the output of the first comparator 212. In an aspect having the sleep power mode detection feature described in reference to FIG. 6 and/or the power collapse power mode detection feature described in reference to FIG. 7, the first transition may also occur upon latching a logical "0" at the output of the second comparator 220. As shown in the FIG. 2 example system 200, a multiplexer such as 218 may provide for these multiple comparator outputs to be latched by the debounce circuit 216.

Referring again to FIG. 8, a load ON rest state 808 is one next state from the load ON interim state 804, through a second transition 810. The second transition 810 may, occur, for example, upon detection through a counter-integrator as described above, of the comparator state continuing at a logical "0" for a qualifying duration such as, for example, 250 ms. The example state machine 800 further includes a load OFF interim state 812 that is a next state from the load. ON rest state 808 through a third transition 814. The third transition 814 may occur, for example, upon latching a logical "1" at the output of the first comparator 212, and/or latching a logical "1" at the output of the second comparator 220.

Continuing with the example 800, the load OFF rest state 802 is a next state from the load OFF interim state 812 through a fourth transition 816. Similar to the second transition 810, the fourth transition 816 may occur through, for example a counter-integrator as described, above, of the comparator state continuing at a logical "1" for a qualifying duration such as, for example, 250 ms. Further, the load OFF rest state 802 is also another next state from the load ON interim state 804 through a fifth transition 818, and the load ON rest state 808 is another next state from the load OFF interim state 812 through a sixth transition 820. In one aspect, the fifth transition 818 may occur upon a detection of the logical "1" transition which state 804 was entered. Similarly, the sixth transition 820 may be a detection of the logical "0" transition by which state 812 was entered.

Referring still to the FIG. 8 example 800, state "transitions" 822, 824, 826 and 828 represent, respectively, the state machine 800 remaining in a state after a dump operation, e.g., after resetting a counter-integrator absent detecting another edge or other transition in the coupling state signals from, for example, the comparators 212, 220.

Figure 9:
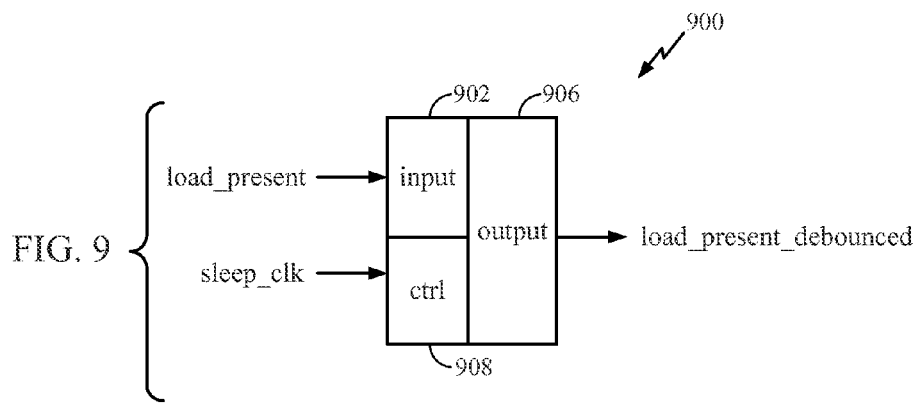
FIG. 9 shows one example of functional flow of a state machine debouncing process according to one aspect of one example load detecting multimode line driver according to one or more various exemplary embodiments.

FIG. 9 shows a high level functional block diagram 900 of an example debounce circuit such as the circuit 216 of the FIG. 2 example system 200. The example 900 includes an input block 902 that detects "load present" signals indicative of a coupling state of a load such as, for example, one or more of the comparator 212 and 220 outputs generating logical "1s" and "0s" in response to the load RL being coupled, or not coupled, to the output node 210. Control block 908 receives an integrator clock, such as the external sleep_clk of the FIG. 3 example 300. An output block 906 generates a LOAD_PRESENT_DEBOUNCED signal indicating, to a certainty defined by the minimum qualifying duration, a change in the status of load such as RL being coupled to an output of the system, such as the load RL being coupled or not coupled to the FIG. 2 output node 210. The LOAD_PRESENT_DEBOUNCED signal may be used to control, for example, a power-up state of the TCM 202.

Figure 10:
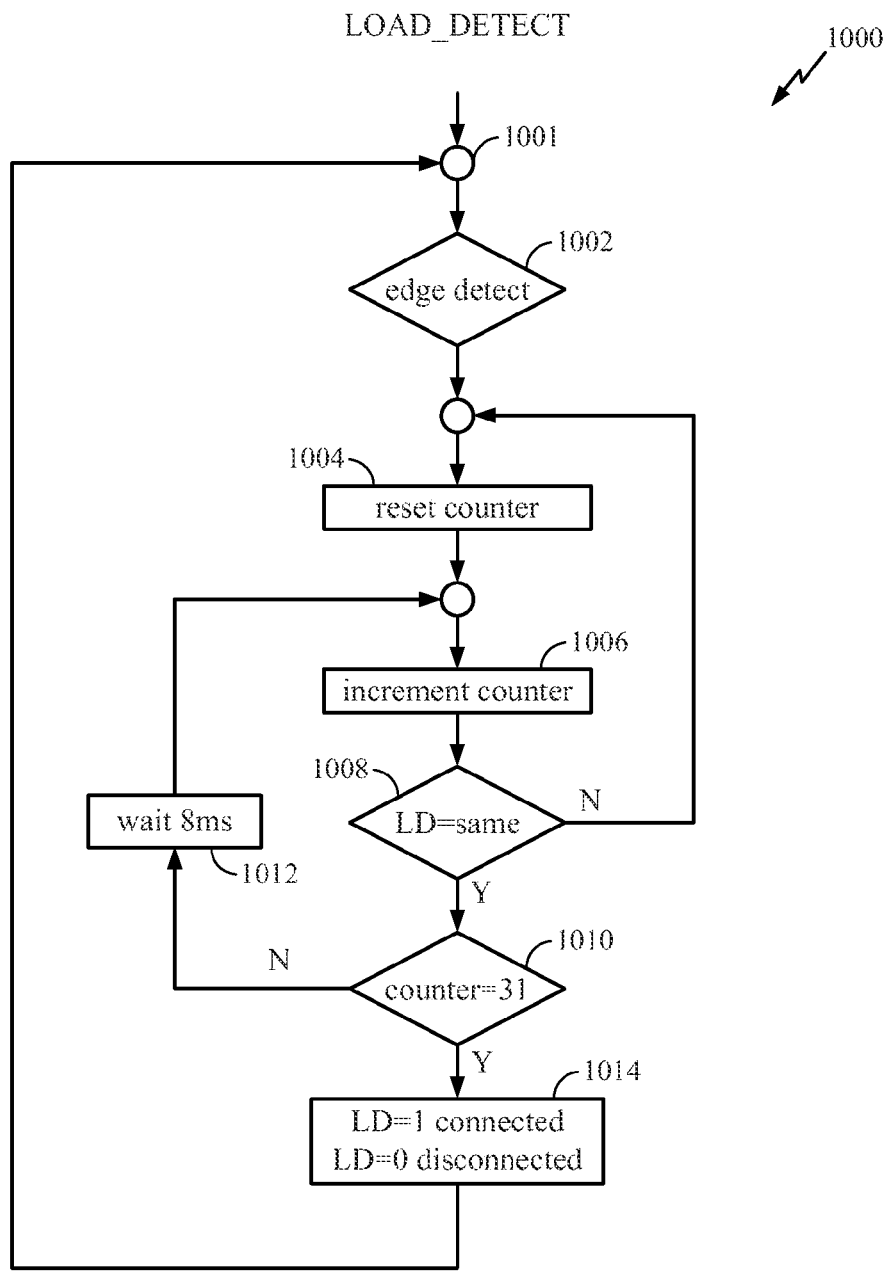
FIG. 10 shows one example of a process flow representation of one illustrative debouncing process according to one aspect of one example load detecting multimode line driver according to one or more various exemplary embodiments.

FIG. 10 shows one example functional flow 1000 of one debounce process in an impedance matched load detecting line driver system according to one or more of the exemplary embodiments.

Referring to FIG. 10, block 1001 represents being in a stable resting state, namely having detected the coupling state of the load, e.g., the coupling of the load RL to the output node 210 continuously for a qualifying period, e.g., the above-described example 250 ms. Block 1002 represents detecting a change in the coupling state, e.g., latching at the edge of the pwm_clk clock an output from one of the comparators 212, 220 different than the state existing at 1001. The output of the comparators 212, 220 may be termed a "load indicating signal," and the latched load indicating signal may be termed a "detected load state." In response, the example flow goes to 1004 to start a duration measurement for a time qualifying process. The start of the duration measurement may, for example, be a resetting of an integrating counter as described previously. At each succeeding occurrence of latching the same load indicating signal the flow goes to 1006, increments the counter, and then to 1008 to determine if the detected load state is the same as the detected load state at the previous cycle of 1008. If the answer at 1008 is "YES" the flow goes to 1010 to determine if the qualifying time has been met, e.g., checking if the integrating counter has rolled aver the bits (such as "11111" to "00000" for a five bit counter) or comparing the count to a given duration count value (not shown). If the answer at 1008 is "NO," meaning the detected load state has changed. prior to meeting the duration criteria at 1010, the flow goes back to 1004 and restarts the duration measurement, e.g., resets the integration counter. If the answer at 1010 is "YES," meaning the duration criterion has been met, the flow goes to 1014 and changes the load state LD to a value of for example, logical "1" or logical "0." In the previously described examples, LD=0 represents the load being connected or coupled, and LD=1 represents the load being not connected or not coupled. If the answer at 1010 is "NO," meaning that the duration criteria has not been met, e.g., the integrating counter not having the required number of successive counts of the same detected load state, the flow goes to 1012, where it waits for the next latched sample of the load indicating signal. In above-described examples, the next latched sample appears at the edge of the pwm_clk after the last incrementing at 1006. An example wait at 1012 is 8 ms, using the previously described example sleep_clk and pwm_clk frequency of 32 kHz. After the wait at 1012 (e.g., 8 ms until the next edge of pwm_clk), the flow goes to 1006, increments the counter and continues until either 1008 resets the count or 1014 changes the load state LD.

In view of exemplary systems shown and described above, methodologies that may be implemented in accordance with the disclosed subject matter, will be better appreciated with reference to various flow charts. While, for purposes of simplicity of explanation, methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein, it is to be appreciated that functionality associated with blocks may be implemented by software, hardware, a combination thereof or any other suitable means (e.g. device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram. Further, the various methods disclosed herein can include employing a processor executing computer executable instructions stored on a computer readable storage medium to implement the methods.

It will be appreciated that data store (e.g., memories) components described herein may include or may be implemented using volatile memory, nonvolatile memory, or both. Nonvolatile memory may include or may be implemented with any non-volatile memory technology capable of meeting performance requirements pertaining to the particular memory function implemented, which can be readily ascertained by persons of ordinary skill in the art upon reading this disclosure, and may include, as illustrative but limitative examples, read only memory (ROM), programmable ROM (PROM), electrically programmable ROM (EPROM), electrically erasable ROM (EEPROM), or flash memory. Volatile memory may include or may be implemented with any volatile memory technology capable of meeting performance requirements pertaining to the particular memory function implemented, which can be readily ascertained by persons of ordinary skill in the art upon reading this disclosure, and may include, as illustrative but limitative examples, synchronous RAM (SRAM), dynamic RAM (DRAM, synchronous DRAM (SDRAM), double data rate SDRAM (DDR SDRAM), enhanced. SDRAM (ESDRAM), Synchlink DRAM (SLDRAM), and direct Rambus RAM (DRRAM). Memory of the various aspects is intended to comprise, without being limited to, these and any other suitable types of memory.

It is to be understood that aspects described herein may be implemented by hardware, software, firmware or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed, herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented, as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described herein.

For a software implementation, techniques described herein may be implemented with modules procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the steps and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or embodiments, it should be noted that various changes and modifications could be made herein without departing from the scope of described aspects and/or embodiments as defined by the appended claims. Accordingly, described aspects are intended to embrace all such alterations, modifications and variations that fall within scope of appended claims. Furthermore, although elements of described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. An impedance matched load detecting line driver, comprising:
    a buffer amplifier switchable between a power-up state coupled to a power voltage on a main power rail and a sleep state in response to a given sleep state signal, having a signal input, a feedback input, a signal output coupled to an output node for coupling to a given load, a feedback resistor coupled between the output node and the feedback input, and a switchable feedback resistor switchably coupling, in response to the sleep state signal, the feedback input to a ground;

a first comparator to generate, while the buffer amplifier is in the power-up state, a first load detection signal based on the voltage at the feedback resistor corresponding to whether a given load is coupled to the output node;

a detection current source to inject a detection current into the output node while the buffer amplifier is in the sleep state, and to inject a detection current into the output node during a collapse of the main power rail, to produce a voltage on the output node corresponding to whether the load is coupled to the output node; and a second comparator to generate, while the detection current is injected into the output node, a second load detection signal based on a resulting voltage at the output node, indicating whether the load is coupled to the output node while the buffer amplifier is in the sleep state and whether the load is coupled to the output node during a collapse of the main power rail.

2. The impedance matched load detecting line driver of claim 1, configured to provide a power collapse mode current path for the detection current from the output node to the main power rail when the main power voltage on the main power rail is collapsed concurrent with the given load being uncoupled from the output node, wherein the detection current passing through said power collapse mode current path generates a voltage on the output node detectable by the second voltage comparator as different than the voltage that the detection current produces on the output node when the given load is coupled to the output node.

3. The impedance matched load detecting line driver of claim 1, wherein the switchable feedback resistor uncouples the feedback input from ground when the buffer amplifier is in the sleep state, and uncouples the feedback input from ground when the power voltage collapses on the main power rail, and otherwise couples the feedback input, with a given resistance, to ground.

4. The impedance matched load detecting line driver of claim 3, wherein the buffer amplifier is a transconductance amplifier generating an output current based on a voltage difference between the voltage input and the feedback input.

5. The impedance matched load detecting line driver of claim 1, configured to provide a sleep mode current path, other than through the given load, from the output node to the ground rail, while the buffer amplifier is in the sleep state, the sleep mode current path having a resistance higher than the load to produce, from the detection current flowing from the output node to ground, the voltage on the output node that corresponds to the coupling state of the load.

6. The impedance matched load detecting line driver of claim 5, wherein the switchable feedback resistor uncouples the feedback input from ground when the buffer amplifier is in the sleep state, and uncouples the feedback input from ground when the power voltage collapses on the main power rail, and otherwise couples the feedback input, with a given resistance, to ground, wherein the switchable feedback resistor, when it uncouples the feedback input from ground when the buffer amplifier is in the sleep state, is removed from the sleep mode current path.

7. The impedance matched load detecting line driver of claim 6, wherein the buffer amplifier is a transconductance amplifier generating an output current based on a voltage difference between the voltage input and the feedback input.

8. The impedance matched load detecting line driver of claim 1, wherein the switchable feedback resistor uncouples the feedback input from ground when the buffer amplifier is in the sleep state, and uncouples the feedback input from ground when the power voltage collapses on the main power rail, and otherwise couples the feedback input, with a given resistance, to ground, and wherein the switchable feedback resistor, when it uncouples the feedback input from ground when the power voltage collapses on the main power rail, is removed from a power collapse mode current path.

9. The impedance matched load detecting line driver of claim 8, further comprising a diode element having a forward threshold voltage, connecting the output node to the main power rail, arranged to be forward biased when a voltage on the output node exceeds a voltage on the main power rail by more than said forward threshold voltage, wherein, while a main power voltage is removed from said main power rail and, concurrently, said given load is not coupled to said output node, the detection current produces a voltage on the output mode forward biasing the diode element and the diode element is within the power collapse mode current path.

10. The impedance matched load detecting line driver of claim 9 wherein, while a main power voltage is removed from said main power rail and, concurrently, the load is coupled to the output node, the detection current produces a voltage on the output node that is less than said forward threshold voltage and the diode element is not within the power collapse mode current path.

11. The impedance matched load detecting line driver of claim 10, wherein the buffer amplifier includes a PFET output device having a body diode effect, and wherein the diode element includes the body diode effect.

12. The impedance matched load detecting line driver of claim 10, wherein the diode element includes an electrostatic discharge diode.

13. The impedance matched load detecting line driver of claim 1, further comprising a debounce circuit having an input coupled to at least one of an output of the first comparator or an output of the second comparator, for filtering based on a given duration criterion at least one of the first load detecting signal or the second load detecting signal.

14. The impedance matched load detecting line driver of claim 13, wherein the debounce circuit includes a state machine having transitions from a state representing a starting steady state of the load coupling to a next state representing a change of the load coupling state not yet meeting the duration criterion, to one of two conditional next states, one being a return to the starting steady state if the change of the load coupling state fails to meet the duration criterion, and the other being a transition to a state representing the other of the steady states of the load coupling, if the change of the load coupling state meets the duration criterion.

15. The impedance matched load detecting line driver of claim 14, wherein said debounce circuit includes a state machine having a load OFF rest state, a load ON interim state that is a next state from the load OFF rest state through a first transition, a load ON rest state that is one next state from the load ON interim state through a second transition, a load OFF interim state that is a next state from the load ON rest state through a third transition, wherein the load OFF rest state is a next state from the load OFF interim state through a fourth transition, the load OFF rest state is another next state from the load ON interim state through a fifth transition, and the load ON rest state is another next state from the load OFF interim state through a sixth transition, wherein the first transition occurs upon detecting a start of a load coupling state, the second transition occurs upon detecting a load coupling state being continuous for greater than a given qualifying duration, the third transition occurs upon detecting a start of a load uncoupled state, the fourth transition occurs upon detecting a load uncoupled state being continuous for greater than the given qualifying duration, the fifth transition occurs upon detecting a load coupling state terminating less than said qualifying duration after detecting the start of said load coupling state, and the sixth transition occurs upon detecting a load uncoupled state terminating less than said qualifying duration after detecting the start of said load uncoupled state, and wherein each of said detecting load coupling states and detecting said load uncoupled states is based on at least one of said first or second load detecting signal.

16. The impedance matched load detecting line driver of claim 1, wherein the first comparator is coupled to a secondary power supply through a first power saving switch, the first power saving switch receiving a first pulse width controlled low duty cycle control clock having a period of P, an ON state having an ON duration of PW, and an OFF state having an OFF duration of P minus PW, wherein said ON state closes said first power saving switch to power said first comparator, and said OFF state opens said first power saving switch to remove power from said first comparator.

17. The impedance matched load detecting line driver of claim 1, wherein at least one of the second comparator and the detection current source is coupled to a secondary power supply through a second power saving switch, the second power saving switch receiving a second pulse width controlled low duty cycle control clock having a given period, a given ON state having a given ON duration, and a given OFF state having a given OFF duration, wherein said ON state closes said second power saving switch to power said at least one of the second comparator and the detection current source, and said OFF state opens said second power saving switch to remove power from said at least one of the second comparator and the detection current source.

18. The impedance matched load detecting line driver of claim 17, wherein the given pulse width is equal to a given PW, and the given period is equal a given P.

19. An impedance matched load detecting line driver, comprising:
a buffer amplifier having a signal input, a feedback input, a signal output, an internal load resistor coupled between the feedback input and a ground rail, and a feedback resistor coupled between the output node and the feedback input; and
a load detector, having a comparator coupled to the feedback resistor and configured to compare a voltage drop across the feedback resistor to a given threshold and to generate a load detecting signal based on the comparison, indicating whether a given load is coupled or not coupled to the output node.

20. The impedance matched load detecting line driver of claim 19, wherein the load detecting line driver further comprises a debounce circuit having an input coupled to an output of the comparator, to generate the load detection signal based on a combination of a change in a state of the output of the comparator and the change of the state having a given continuous duration meeting a given duration criterion.

21. The impedance matched load detecting line driver of claim 20, wherein the debounce circuit includes a state machine having transitions from a state representing a starting steady state of the load coupling to a next state representing a change of the load coupling state not yet meeting the duration criterion, to one of two conditional next states, one being a return to the starting steady state if the change of the load coupling state fails to meet the duration criterion, and the other being a transition to a state representing the other of the steady states of the load coupling, if the change of the load coupling state meets the duration criterion.

22. The impedance matched load detecting line driver of claim 19, wherein the comparator is a first comparator, and wherein the load detector further comprises a detection current source configured to inject a detection current into the output node and a second comparator configured to generate the load detection signal based on a voltage at the output node while said detection current is being injected into the output node.

23. The impedance matched load detecting line driver of claim 22, further comprising a control clock generator configured to generate at least one low duty cycle control clock having a period of P, an ON state duration of PW, and an OFF state duration of P-PW, wherein the power rail is a main power rail, and wherein at least one of the detection current source and the second comparator is selectively coupled to a secondary power rail through a power saving switch that is controlled by at least one of the low duty cycle control clocks,
wherein said ON state of the at least one of the low duty cycle clocks closes said power saving switch to power said second comparator, and said OFF state of the at least one of the low duty cycle clocks opens said power saving switch to remove power from said second comparator.

24. A method for impedance matched load detecting for a buffer amplifier selectively coupled to a main power rail and capable of switching between a power on state and a sleep state, having a signal input, a feedback input, a signal output coupled to an output node, comprising:
switching the buffer amplifier to the power-on state, and coupling the feedback input of the buffer amplifier to ground, to generate an output signal and a feedback voltage corresponding to whether a given load is coupled to the output node;
generating a first load detection signal, based on the feedback voltage, indicating whether a given load is coupled to the output node;
switching the buffer amplifier to the sleep state and uncoupling the feedback input from ground;
injecting a detection current into the output node, and detecting a corresponding resulting voltage on the output node;
generating a second load detection signal, based on said corresponding resulting voltage, indicating whether the load is coupled to the output node while the buffer amplifier is in the sleep state;
in response to removal of a main power voltage from a main power rail, uncoupling the feedback input from ground, injecting a detection current into the output node and detecting a corresponding test voltage on the output node; and
generating another second load detection signal, based on said power collapse load test voltage, indicating whether the load is coupled to the output node while the main power is removed from the main power rail.

25. A load detecting impedance matched load buffer apparatus, comprising:
an amplifier means for receiving an input signal and a feedback signal and, in response to receiving a main power and a sleep state signal indicating a power-on state, outputting an output signal to an output mode;
means for generating a first load detection signal indicating whether a given load is coupled to the output node, based on the feedback voltage;

means for injecting a detection current into the output node, the injection being
concurrent with the sleep state signal indicating a sleep state, to produce a sleep mode voltage on the output mode corresponding to whether the load is coupled to the output node, and
concurrent with a collapse of a voltage on the main power rail, to flow from the output node through the load when coupled to the output node, and from the output node and to the main power rail when the load is not coupled, to produce a power collapse mode voltage on the output node corresponding to whether the load is coupled; and
means for generating a second load detection signal corresponding to the sleep mode voltage on the output node, and in response to the power collapse mode voltage.

26. A method for impedance matched load detecting for a buffer amplifier selectively coupled to a main power rail and capable of switching between a power on state and a sleep state, a signal input, a feedback input, a signal output coupled to an output node, comprising steps of:
generating an output signal, and a feedback voltage corresponding to whether a given load is coupled to the output node, said step including steps of switching the buffer amplifier to the power-on state;
generating a first load detection signal, based on the feedback voltage, indicating whether a given load is coupled to the output node;
switching the buffer amplifier to the sleep state;
injecting a detection current into the output node while the buffer amplifier is in the sleep state, and detecting a corresponding resulting voltage on the output node;
generating a second load detection signal, based on said corresponding resulting voltage, indicating whether the load is coupled to the output node while the buffer amplifier is in the sleep state;
in response to removal of a main power voltage from a main power rail, performing the steps of injecting a detection current into the output node and detecting a corresponding power collapse mode test voltage on the output node; and
generating another second load detection signal, based on said power collapse mode test voltage, indicating whether the load is coupled to the output node while the main power is removed from the main power rail.

27. The impedance matched load detecting line driver of claim 1, further comprising:
a multiplexer having a multiplexer first input coupled to an output of the first comparator, a multiplexer second input coupled to an output of the second comparator, and a multiplexor output; and
a debounce circuit having an input coupled to the multiplexer output, configured for filtering, based on a given duration criterion at least one of the first load detecting signal or the second load detecting signal received from the multiplexor output.

28. The impedance matched load detecting line driver of claim 19, wherein the buffer amplifier further comprises a first voltage-to-current stage having a first stage PFET coupled between a power rail and the feedback node, having a gate coupled to the signal output, a second voltage-to-current stage coupled between the power rail and the output node, having a second stage PFET having a gate coupled to the signal output.

29. The impedance matched load detecting line driver of claim 19, further comprising a control clock generator configured to generate at least one low duty cycle control clock having a period of P, an ON state duration of PW, and an OFF state duration of P-PW,
wherein the comparator is selectively coupled to a secondary power rail through a power saving switch that is controlled by at least one of the low duty cycle control clocks, and
wherein the ON state of the at least one of the low duty cycle clocks closes the power saving switch to power the comparator, and the OFF state of the at least one of the low duty cycle clocks opens the power saving switch to remove power from the comparator.

30. The impedance matched load detecting line driver of claim 29, wherein the comparator is a first comparator, wherein the power saving switch is a first power saving switch,
wherein the load detector further comprises a detection current source to inject a detection current into the output node and a second comparator configured to generate the load detection signal based on a voltage at the output node while said detection current is being injected into the output node,
wherein the second comparator is selectively coupled to the secondary power rail through a second power saving switch that is controlled by at least one of the low duty cycle control clocks, and
wherein the ON state of the at least one of the low duty cycle clocks closes the second power saving switch to power the second comparator, and the OFF state of the at least one of the low duty cycle clocks opens the second power saving switch to remove power from the second comparator.

31. The impedance matched load detecting line driver of claim 19, wherein the comparator is a first comparator, and wherein the load detector further comprises a detection current source to inject a detection current into the output node and a second comparator configured to generate the load detection signal based on a voltage at the output node while said detection current is being injected into the output node.

32. The method of claim 24, wherein coupling the feedback input of the buffer amplifier to ground comprises coupling the feedback input of the buffer amplifier to ground through an internal load resistance having a resistance value proportional to and greater than a given load resistance value, wherein the method further comprises coupling the output node to the feedback input through a feedback resistor.

33. The method of claim 32, further comprising, while the buffer amplifier is in the power on state, feeding a first stage current to the internal load resistor based on a voltage on the signal output of the buffer amplifier, and feeding a second stage current to the output node, based on the voltage on the signal output of the buffer amplifier.

34. The method of claim 33, wherein the feedback voltage is a voltage drop across the feedback resistor.

35. A method for load detecting for a buffer amplifier having a signal input and a signal output coupled to an output node, comprising:
generating a control clock;
generating a load indicating signal having states including a first state and a second state based, at least in part, on a coupling state of a load to the output node;
detecting an edge comprising a change of the state of the load indicating signal, wherein said detecting includes latching the load indicating signal as a latched load indicating signal;

in response to detecting the edge, determining if the change of the state meets a count criterion, wherein said determining comprises
i) setting a counter to a given start count,
ii) incrementing the counter based on the control clock,
iii) defining as a previous latched load indicating signal the latched load indicating signal, and again latching the load indicating signal based on the control clock to generate another latched load indicating signal,
iv) comparing the state of said latched load indicating signal to the state of the previous latched load indicating signal, and
in response to a difference between the state of said latched load indicating signal and the previous latched load indicating signal, terminating said determining and returning to detecting an edge,
in response to no difference between the state of said latched load indicating signal and the previous latched load indicating signal,
comparing the counter to a given qualifying count criterion,
in response to the counter not meeting the qualifying count criterion, repeating (ii)-(iv), and
in response to the counter meeting the qualifying count criterion, determining that the change of the state meets the count criterion; and
in response to determining that the change of the state meets the count criterion generating a debounced load detection signal.

36. The method of claim 35, further comprising:
feeding back a feedback signal, through a feedback resistor, from the output node to a feedback input of the buffer amplifier; and
coupling the feedback node, through an internal load resistor, to a ground rail,
wherein generating a load indicating signal comprises detecting a voltage drop across the feedback resistor.

37. An apparatus for load detecting for a buffer amplifier having a signal input and a signal output coupled to an output node, comprising:
means for generating a control clock;
means for generating a load indicating signal having states including a first state and a second state based, at least in part, on a coupling state of a load to the output node;
means for detecting an edge comprising a change of the state of the load indicating signal, wherein said detecting includes latching the load indicating signal as a latched load indicating signal; and
means for counting iterations of the control clock, starting in response to detecting the edge and ending in response to the earlier of detecting another change of the state of the load indicating signal and counting of the iterations reaching a given count criterion; and
means for generating, in response to the counting iterations ending in response to the counting of the iterations reaching the count criterion, a debounced load detection signal.

* * * * *